US012579374B1

(12) United States Patent
Cameron et al.

(10) Patent No.: US 12,579,374 B1
(45) Date of Patent: Mar. 17, 2026

(54) CONDITIONAL LOGIC FOR DOMAIN SPECIFIC SYSTEMS USING LARGE LANGUAGE MODELS

(71) Applicant: NVIDIA Corporation, Santa Clara, CA (US)

(72) Inventors: James Cameron, Fredericton (CA); Ruthie Lyle, Durham, NC (US)

(73) Assignee: NVIDIA Corporation, Santa Clara, CA (US)

( * ) Notice: Subject to any disclaimer, the term of this patent is extended or adjusted under 35 U.S.C. 154(b) by 402 days.

(21) Appl. No.: 18/150,424

(22) Filed: Jan. 5, 2023

(51) Int. Cl.
| | |
|---|---|
| *G06F 40/40* | (2020.01) |
| *G06F 40/151* | (2020.01) |
| *G06F 40/166* | (2020.01) |
| *G06F 40/30* | (2020.01) |
| *G06V 20/40* | (2022.01) |

(52) U.S. Cl.
CPC ............ *G06F 40/40* (2020.01); *G06F 40/151* (2020.01); *G06F 40/166* (2020.01); *G06V 20/40* (2022.01); *G06F 40/30* (2020.01)

(58) Field of Classification Search
None
See application file for complete search history.

(56) References Cited

U.S. PATENT DOCUMENTS

| | | | | |
|---|---|---|---|---|
| 10,671,428 | B2 * | 6/2020 | Zeitlin | .................. G06F 9/5027 |
| 11,462,215 | B2 * | 10/2022 | Piernot | ............... G10L 15/1815 |

| | | | | |
|---|---|---|---|---|
| 2014/0330435 | A1 * | 11/2014 | Stoner | ...................... F24F 11/30 |
| | | | | 700/275 |
| 2017/0085637 | A1 * | 3/2017 | Cencini | .................. G06F 1/206 |
| 2017/0249309 | A1 * | 8/2017 | Sarikaya | ........... G06Q 10/1093 |

(Continued)

FOREIGN PATENT DOCUMENTS

| | | | | |
|---|---|---|---|---|
| CN | 114419924 | A | * | 4/2022 |
| CN | 114565282 | A | * | 5/2022 ............. G05D 1/101 |

(Continued)

OTHER PUBLICATIONS

Chowdhery et al., "PaLM: Scaling Language Modeling with Pathways", published Oct. 5, 2022; https://arxiv.org/pdf/2204.02311.pdf [retrieved Apr. 4, 2023].

(Continued)

*Primary Examiner* — Paras D Shah
*Assistant Examiner* — Jacob B Vogt
(74) *Attorney, Agent, or Firm* — Plumsea Law Group, LLC

(57) ABSTRACT

Systems and methods for automatically performing actions for a user or system in response to receiving natural language statements. The systems and methods use a large language model to transform the natural language statements into conditional logic for domain specific systems, which systems can perform the corresponding actions. In domains such as a data center or a smart city, the systems and methods provide an intelligent system that can identify conditional statements including conditions and corresponding actions in response to natural language statements. These conditional statements are interpreted as rules in the context of the domain, such that the methods and system ascertain that conditions are met and perform corresponding actions. If there are issues interpreting the conditionals, the systems and methods can use a feedback loop to gather additional information.

20 Claims, 12 Drawing Sheets

(56) References Cited

U.S. PATENT DOCUMENTS

| | | | |
|---|---|---|---|
| 2017/0278514 A1* | 9/2017 | Mathias | G06F 16/35 |
| 2018/0114437 A1* | 4/2018 | Singh | G08G 1/015 |
| 2019/0051163 A1* | 2/2019 | Malkes | G08G 1/0145 |
| 2019/0121854 A1* | 4/2019 | Amri | G10L 15/22 |
| 2019/0163594 A1* | 5/2019 | Hayden | G06F 11/3024 |
| 2019/0294487 A1* | 9/2019 | Thomas | G06F 11/0709 |
| 2020/0118039 A1* | 4/2020 | Kocberber | G06N 20/00 |
| 2020/0134103 A1* | 4/2020 | Mankovskii | G06F 40/56 |
| 2020/0134423 A1* | 4/2020 | Shinde | G06F 11/0751 |
| 2021/0003974 A1* | 1/2021 | Yang | G05B 13/027 |
| 2021/0125078 A1* | 4/2021 | Malhan | G06N 3/042 |
| 2021/0132926 A1* | 5/2021 | Wangikar | H04L 67/34 |
| 2021/0135489 A1* | 5/2021 | Stites-Clayton | H02J 13/00004 |
| 2022/0182293 A1* | 6/2022 | Mishra | H04L 41/0246 |
| 2022/0232353 A1* | 7/2022 | Badros | G06F 40/20 |
| 2024/0143928 A1* | 5/2024 | Zorn | G06F 40/56 |

FOREIGN PATENT DOCUMENTS

| | | | | | |
|---|---|---|---|---|---|
| CN | 114390079 B | * | 6/2022 | | G06F 16/25 |
| CN | 115455158 A | * | 12/2022 | | |
| WO | WO-2022256936 A1 | * | 12/2022 | | G06F 16/3344 |
| WO | WO-2022258775 A1 | * | 12/2022 | | G06N 3/08 |

OTHER PUBLICATIONS

Abraham et al., "TableQuery: Querying tabular data with natural language", published Jan. 27, 2022; https://arxiv.org/pdf/2202.00454.pdf [retrieved Apr. 4, 2023].

* cited by examiner

CONDITIONAL LOGIC FOR DOMAIN SPECIFIC SYSTEMS USING LARGE LANGUAGE MODELS

TECHNICAL FIELD

The present disclosure generally relates to machine learning, and in particular to systems using language models.

BACKGROUND

Machine learning has been deployed in a variety of different circumstances. In many situations, systems requiring conditional logic statements may rely on conditional logic statements hardcoded by the user.

There is a need in the art for a system and method that addresses the shortcomings discussed above.

SUMMARY

Creating conditional logic statements that detect specific environmental states based on sensor data takes a combination of both programming knowledge and subject matter expertise. It is much easier to provide such conditional language statements using natural language. For example, a user may specify in natural language a condition to detect using sensor information as well as an appropriate response. Such natural language statements may be interpreted using artificial intelligence techniques, including large language models (LLMs), to yield formal conditional logic statements. These conditional logic statements may be interpreted in context and provided for human consumption. Alternatively, the conditional logic statements may be provided as rules for a domain management system. Such a domain management system adopts the conditional logic statement to a particular domain. By doing so, the system can determine that a condition is satisfied in the domain and take appropriate corresponding actions in the context of the domain. Furthermore, if the natural language statements yield conditional logic statements that are ambiguous, logically incomplete, or in conflict with other system constraints, the domain managements system can interact further with the LLMs and the user to resolve such ambiguity and help understand the intended meaning of the natural language statements.

In one aspect, the techniques described herein relate to systems and methods for automatically performing an action for a user or system in response to receiving natural language statements. The systems and methods use one or more large language models to transform the one or more natural language statements into conditional logic statements. These conventional logic statements may then be processed in a domain to perform one or more actions in the domain using one or more domain specific algorithms.

In the domain of data centers, the systems and methods provide an intelligent data center system that may recommend actions to a user of the data center or automatically take actions in response to natural language statements. Such statements express actions taken in response to a problematic condition at the data center. Likewise, in the domain of smart cities, the systems and methods provide an intelligent smart city system that may recommend actions to a user of the smart city system or automatically take actions in response to natural language statements. Such statements express actions to taken in response to a problematic condition at the smart city system.

In various domains, the domain specific algorithms use sensors to determine when a condition of conditional statement is satisfied. The domain specific algorithms may then perform an appropriate corresponding action. The large language model is able to infer information that may be used by a domain specific system, even when that information is not explicitly stated by the user. The large language model can also be used to combine options generated by the large language model with relevant information about the domain. For example, the information may include historical data about conditional statements or real time sensor data. Such information may provide the system with additional context in choosing among the provided options when performing an option.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DESCRIPTION OF THE EMBODIMENTS

Figure 1:
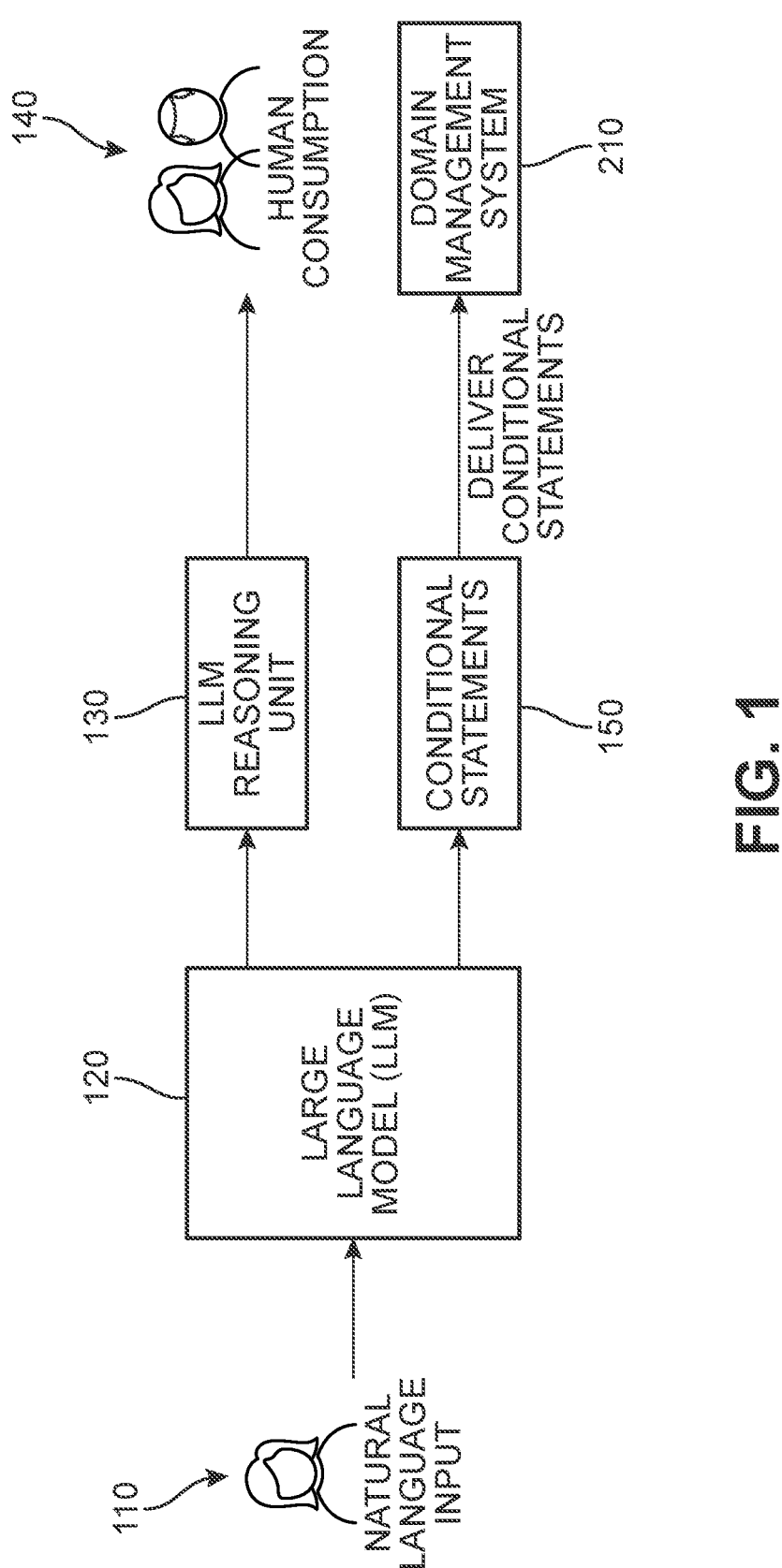
FIG. 1 is a schematic view of a system for converting natural language into conditional language statements, according to an embodiment.

FIG. 1 is a schematic view of a system for converting natural language into conditional language statements that are deployed within a particular domain management system, according to an embodiment. The system receives natural language input 110, including one or more natural language statements, from a user of the system. Such natural language input 110 may take on various forms. For example, the natural language input 110 could take the form of spoken audio provided to the system by using a microphone or another audio sensor. The natural language input 110 could also take on the form of typed text which may be input for the system using a keyboard. However, these are not to be taken as limiting, and other methods of providing the natural language input 110 may be contemplated in other embodiments. Further details of receiving and processing natural language input 110 are discussed below, in the context of FIG. 3.

Once the system receives the natural language input 110, the natural language input 110 is provided to a large language model 120 ("LLM 120") for processing and recognition. In addition, some embodiments may use or include other artificial intelligence techniques. These artificial intelligence techniques may include other Natural Language Processing (NLP) techniques. Any kind of NLP may be used. However, in the examples presented throughout this disclosure, Large Language Models (LLMs) may be used. Some LLMs may include a very large number of parameters. In some cases, LLMs may use hundreds of billions or trillions of parameters. To accommodate this scale of computing, these LLMs may be executed on custom, proprietary machine learning processors or chips. However, in other embodiments, LLMs may be executed using commercially available hardware. A non-limiting example of an LLM running on proprietary hardware is the Bidirectional Encoder Representations from Transformers (BERT)-Large language model that runs on 1,472 NVIDIA® V100 GPUs. Another non-limiting example of an LLM running on proprietary hardware is Google® Research's Pathways Language Model (PaLM) that runs on a cluster of 6144 proprietary TPU chips. Other examples of LLMs include Gopher by DeepMind® and OpenAI®'s GPT-3 (Generative Pre-Trained Transformer-3). The preparation and the amount of training provided to the LLMs prior to use may vary. In some cases, very little training may be provided to the LLM. In some embodiments, the LLM is trained with zero-shot or few-shot. In other embodiments, the initial training includes fine tuning techniques. In different embodiments, the system can use one or more machine learning models—such as deep neural networks (DNNS)—to perform various tasks with respect to identifying topics. For example, a large language model (LLM) may use common sense reasoning or chain of through prompting to determine how conditional logic corresponds to natural language input. For example, the LLM may analyze the natural language input to identify key words and the relationship between words in the natural language input. This analysis may allow the LLM to reason based on the natural language input and sensor readings to convert the natural language into structured conditional logic. The LLM can further determine that a condition is satisfied and take appropriate action or generate an explanation corresponding to the conditional logic. Additional details of such an LLM 120 are discussed further below, such as in the context of FIG. 3.

Some embodiments may include provisions for performing natural language processing on the natural language statements. In some embodiments, the processing may be performed on a central processing unit (CPU). Such a CPU may be a NVIDIA® Grace™ CPU. In some cases, the processing may be performed on a graphics processing unit (GPU). Such a GPU may be a NVIDIA® Hopper™ GPU. In some embodiments, the processing may be performed using a combination of at least one CPU and at least one GPU. The at least one CPU may be at least one NVIDIA® Grace™ CPU and the at least one GPU may be at least one NVIDIA® Hopper™ GPU. In some cases, the processing may be performed using serial processing. In some embodiments, the processing may be performed using parallel processing. In some cases, the parallel processing may use at least one parallel processing accelerator. The at least one NVIDIA® Hopper™ GPU may be at least one parallel processing accelerator. The at least one NVIDIA® Grace™ CPU may also accelerate natural language processing. In some embodiments, the at least one CPU and the at least one GPU may communicate with each other. In some cases, the communication may use chip-to-chip communication. The chip-to-chip communication may use NVIDIA® NVLink™ C2C to interact. This communication technology may allow very high-bandwidth communication such as 900 GB/s communication.

In some embodiments, the at least one CPU and at least one GPU may be able to access a block of memory. In some cases, the block of memory is a block of coherent memory. In some embodiments, the at least one CPU and/or the at least one GPU use the block of coherent memory to provide a parallel processing accelerator with the ability to use the block of memory when performing nature language processing. In some cases, the amount of memory accessed may be very large. A NVIDIA® Grace™ Hopper™ Superchip may be able to access 150 terabytes (TBs) of system memory. In some embodiments, the NVIDIA® Grace™ Hopper™ Superchip uses Extended GPU Memory (EGM) technologies to access this quantity of memory. In some cases, the memory access may be very fast. In some embodiments, a NVIDIA® Hopper™ GPU may be able to use an NVSwitch fabric. In some cases, a NVIDIA® Hopper™ GPU may be able to use EGM to access 150 TBs of coherent memory, such as by using low-power double data rate 5× (LPDDR5×) and high bandwidth memory 3 (BM3) technologies. In some embodiments, the NVIDIA® Hopper™ GPU can achieve bandwidth of 450 GB/s.

One or more of the teachings found in the following references may be used to facilitate access to large quantities of coherent memory, including access to up to 150 TB or more. "Teachings" includes features, items, components, systems, methods or processes. Each teaching may be combined with other teachings in the same reference or in different references. Each teaching may also be combined with existing technologies or related art. The following references are hereby incorporated by reference in their entirety for all purposes: U.S. application Ser. No. 17/691, 621 filed Mar. 10, 2022, titled "Cooperative Group Arrays"; U.S. application Ser. No. 17/691,276 filed Mar. 10, 2022, titled "Method And Apparatus For Efficient Access to Multidimensional Data Structures And/Or Other large Data Blocks"; U.S. application Ser. No. 17/691,759 filed Mar. 10, 2022, titled "Virtualizing Hardware Processing Resources in a Processor"; U.S. application Ser. No. 17/691,288 filed Mar. 10, 2022, titled "Programmatically Controlled Data Multicasting Across Multiple Compute Engines"; U.S. application Ser. No. 17/691,296 filed Mar. 10, 2022, titled "Hardware Accelerated Synchronization With Asynchronous Transaction Support"; U.S. application Ser. No. 17/691,303 filed Mar. 10, 2022, titled "Fast Data Synchronization In Processors And Memory"; U.S. application Ser. No. 17/691,406 filed Mar. 10, 2022, titled "Efficient Matrix Multiply and Add with a Group of Warps,"; U.S. application Ser. No. 17/691,872 filed Mar. 10, 2022, titled "Techniques for Scalable Load Balancing of Thread Groups in a Processor"; U.S. application Ser. No. 17/691,808 filed Mar. 10, 2022, titled "Flexible Migration Of Executing Software Between Processing Components Without Need for Hardware Reset"; U.S. application Ser. No. 17/691,422 filed Mar. 10, 2022, titled "Method And Apparatus For Efficient Access To Multidimensional Data Structures And/Or Other Large Data Blocks"; U.S. application Ser. No. 17/698,409 filed Mar. 18, 2022, titled "High Bandwidth Extended Memory in a Parallel Processing System"; U.S. Provisional Application No. 63/399,782 filed Aug. 22, 2022, titled "Hopper Provisional Placeholder"; U.S. application Ser. No. 17/691,690 filed Mar. 10, 2022, titled "Distributed Shared Memory"; "NVIDIA Grace CPU Superchip Whitepaper (v. 1.0)," attached as Appendix A; "NVIDIA Grace Hopper Superchip Architecture In-Depth (Nov. 10, 2022)," attached as Appendix B; "NVIDIA Grace Hopper Superchip Architecture (v. 1.01)," attached as Appendix C; and "NVIDIA Grace CPU Superchip," attached as Appendix D.

In general, the LLM 120 performs two main tasks. One task performed by the LLM 120 is that it generates a large language model reasoning result 130 provided for human consumption 140. Such a task is performed by producing a conditional statement, assessing whether the conditions of the conditional statement are met, and providing a corresponding action for human consumption 140.

Another task performed by the LLM 120 is that it converts a natural language statement into one or more conditional statements 150. The system then delivers the one or more conditional statements 150 to a domain management system 210, as shown in the example of FIG. 1. The domain management system 210 gathers the one or more conditional statements 150 and manages their execution. For example, the system may deliver the one or more conditional statements 150 to a domain management system 210. Such a domain management system 210 is able to handle the one or more conditional statements 150 when managing the operation of the domain. Non-limiting examples of such a domain management system 210 include a data center management system and a smart city management system, whose operations are discussed in further detail below.

As used herein, a domain management system may refer to any collection of hardware and/or software components that are configured to monitor and/or take specific actions within a given domain. By contrast with a large language model, which is configured to generate outputs in the form of text or related formats, a domain management system may facilitate control of one or more systems in a particular domain. These can include both computational systems and other physical systems. In some cases, a domain management system either directly controls, or communicates with, various kinds of controllers. In some cases, a domain management system controls one or more connected devices, such as Internet of Things (IoT) devices, allowing the domain management system to control both computing environments and physical environments.

As an example, in the context of controlling network traffic, a user may provide, as the natural language input 110, the sentence "I want to be notified when my east/west network traffic exceeds 16 Gbps to a single compute node and balance the load of the application." This sentence is provided to, and analyzed by, the LLM 120 with the goal of identifying a corresponding conditional statement that can be stored and implemented by domain management system 210. The large language model reasoning result 130 for this example may be the observation that the east/west network traffic exceeds the stated threshold of 16 Gbps.

Accordingly, a notification for human consumption 140 may alert a human user that this event has occurred and the human user can then act accordingly. Alternatively, and/or in parallel with delivering a reasoning result to a human user, the system may transform the input into a conditional statement that can be used by domain management system 210. In this particular example, LLM 120 may generate the conditional statement "IF internal network traffic >16 Gbps, THEN send message/email to IT Admin group, AND rebalance loads across the nodes." This representation of the conditional statement is provided as pseudo-code.

However, it is to be noted that other pseudo-code representations may be used for the conditional. Alternatively, the conditional may be represented using the syntax of a high-level language, such as C, C++, C#, Java, Python, and so on as non-limiting examples. In some cases, a suitable syntax may be determined according to the configuration of domain management system 210. For example, if domain management system 210 is configured to use statements coded in the C language for operating one or more controllers, then LLM 120 may be configured to output conditional statements in C. In other cases, LLM 120 could output pseudocode, which is then converted by domain management system 210 into a particular syntax, using a code conversion module (not shown).

Once the conditional statement is provided to the domain management system 210 in this example, the domain management system 210 can take appropriate action. For example, the domain management system 210 may cause data center management software to send an email to an IT Admin group. Alternatively, the domain management system 210 may automatically provision a new application and point a load balancer to a new instance and/or create a duplicate application instance on a separate hardware node, such as by using a Bluefield 3 environment. Such actions may take place using a point load balancer for the new instance to ensure network traffic is more evenly distributed.

Figure 2:
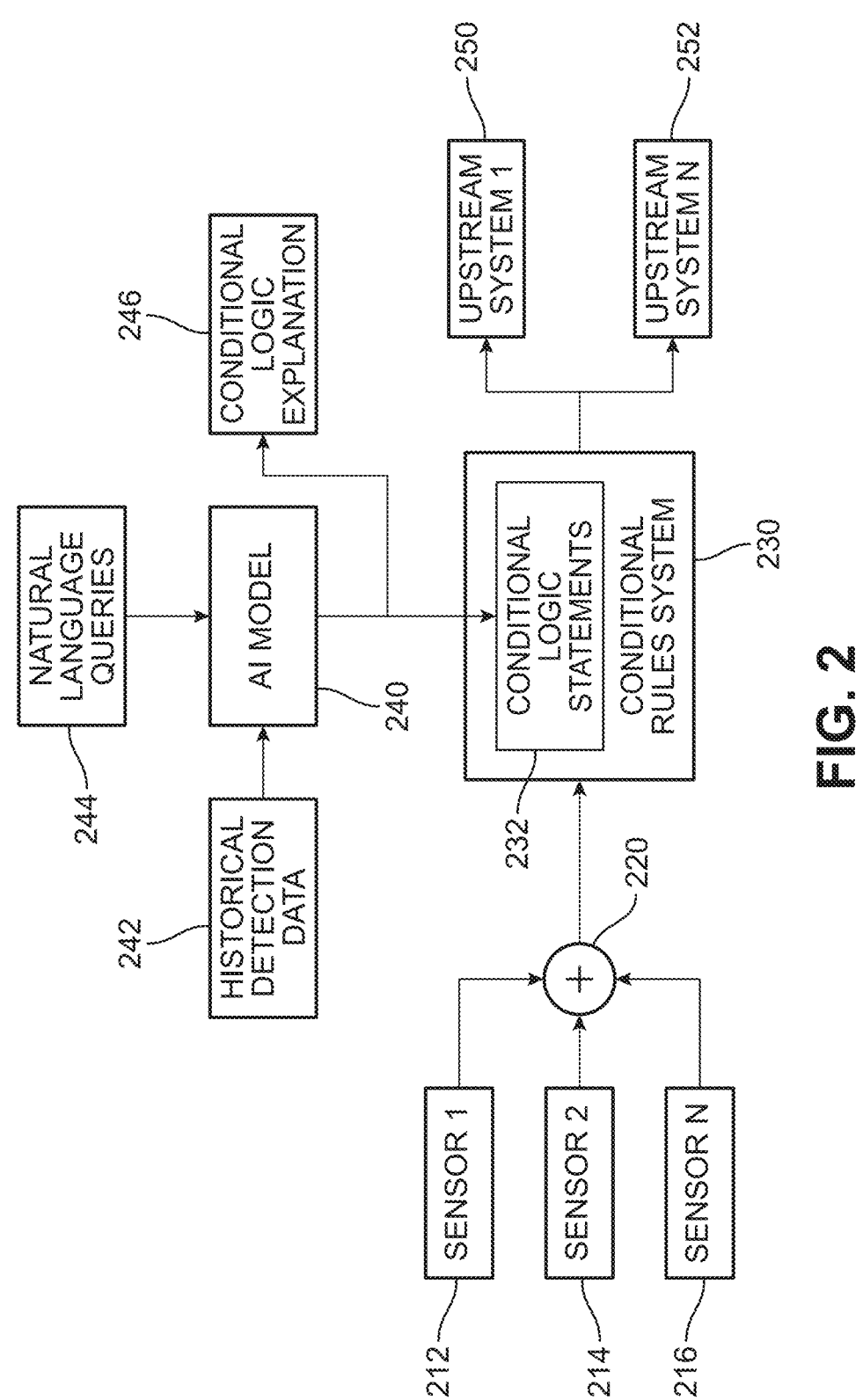
FIG. 2 is a schematic view of a system for inserting generated conditional statements into a system in lieu of human created static conditional statements, according to an embodiment.

FIG. 2 is a schematic view of a system for inserting generated conditional statements into a system in lieu of human created static conditional statements, according to an embodiment. The domain management system 210 may include, or communicate with, sensors that detect information about the operating status of a domain, such as a data center. For example, these sensors could include sensor 212 ("sensor 1"), sensor 214 ("sensor 2"), and other sensors up to sensor 216 ("sensor N"). However, these are only examples of sensors. More sensors or fewer sensors may be used in other embodiments.

In some cases, the sensors may include cameras that use machine vision or other approaches to determine conditions at the data center. The sensors may also include microphones that can capture audio of the data center to identify circumstances at the data center. The microphones may also allow a user to provide a natural language statement that is processed as in FIG. 1 and FIG. 3. However, the sensors could also provide other types of information. For example, the sensors could track network traffic, input and output (i/o) for memory or a storage unit or disk, CPU usage, GPU usage, power usages, a number of users connected, and so on.

These are examples of sensors in the context of a data center domain. It is to be recognized that the principles presented herein are not to be limited to operation in the context of a data center domain. Another example domain is an environment such as a smart city. An example of such smart city platform is NVIDIA® Metropolis. In the case of a such a smart city platform, many of the sensors are cameras that gather ongoing streams of video. These streams of video are processed using video analytics and machine vison. Such video analytics may establish information related to the smart city, such as traffic patterns. However, other sensors such as Laser Imaging, Detection, and Ranging (LIDAR) and Radio Detection and Ranging (RADAR) may be used in the smart city domain.

The outputs of the sensor 212, sensor 214, and sensor 216 are provided to a sensor analysis unit 220. The sensor analysis unit 220 processes the output of the sensor, 212, sensor 214, and sensor 216 to test if conditions of conditional statements are satisfied. When conditions are satisfied, the system takes appropriate corresponding actions. For example, the sensor analysis unit 220 provides results to a conditional rules system 230. The conditional rules system 230 includes conditional logic statements 232. The conditional logic statements 232 may include hardcoded conditional logic statements entered by users in advance. However, the conditional logic statements 232 may also receive conditional logic statements generated by an LLM (for example, conditional logic statements 150 generated by LLM 120 in FIG. 1). By receiving such conditional logic statements, the system is more flexible and convenient than other approaches.

When interpreting the results of the sensor 212, sensor 214, and sensor 216, the conditional rules system 230 can also use an Artificial Intelligence (AI) model 240. Such a model provides for using domain specific information to help interpret the raw sensor data when determining how to manage conditional logic statements 232. For example, the AI model 240 may receive historical detection data 242 and previous natural language queries 244. The AI model 240 may provide this information to the conditional rules system 230. Based on the results of conditional logic checks, the conditional rules system 230 may provide instructions to take an action. Alternatively, the conditional rules system 230 may provide a conditional language explanation 246.

The conditional rules system 230 may also be capable of interacting with upstream systems, such as upstream system 250 and upstream system 252. Such interaction provides additional information to the conditional rules system 230 and allows it to initiate appropriate responsive actions. For example, such upstream systems may be controlled systems, such as air conditioning (AC) units, lighting units, or virtual machines (VMs) in a data center domain, or traffic signals in a smart city domain. Such upstream systems may provide information and take actions. For example, an AC unit may operate to lower the temperature of a data center by generating chilled air, and may also include a thermometer to help measure temperature changes for the data center.

Figure 3:
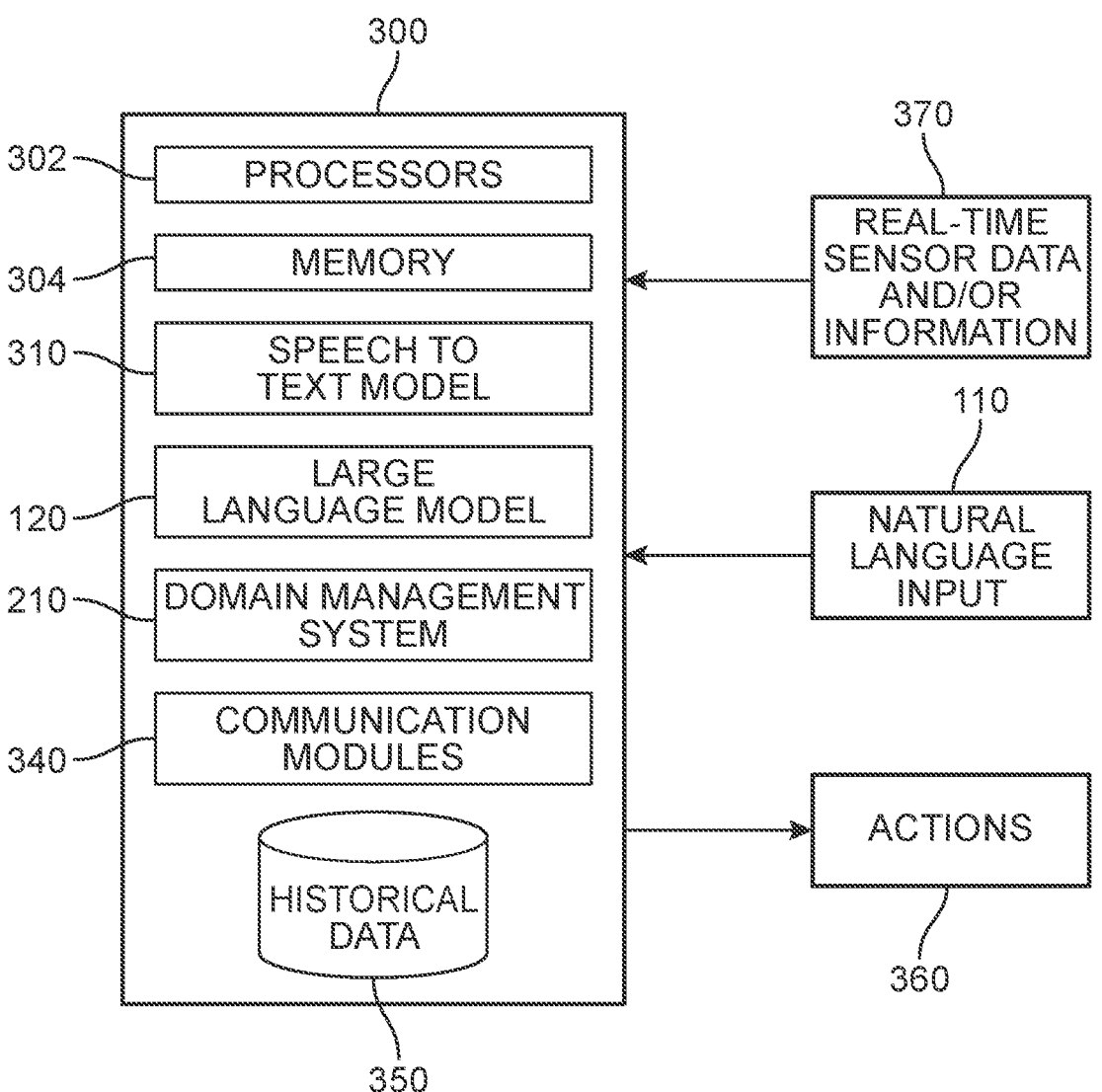
FIG. 3 is a schematic view of a system for taking an action in response to a receiving a natural language statement from a user, according to an embodiment.

FIG. 3 is a schematic view of a system 300 for taking an action (output as actions 360) in response to natural language input 110 from a user, according to an embodiment. System 300 may comprise processors 302 and memory 304.

Memory 304 may comprise a non-transitory computer-readable media for storing instructions that may be executed by processors 302.

System 300 can include a speech-to-text model 310. Speech-to-text model 310 may comprise any suitable natural language processing (NLP) algorithm(s) for converting spoken words into text. In one exemplary embodiment, described in further detail below, a user at a domain management system 210 may speak one or more natural language statements into a microphone, and the captured audio can be transmitted to speech-to-text model 310.

The captured audio can be transformed, by speech-to-text model 310, into text that can be used as inputs to other components or modules. Embodiments could use any suitable speech-to-text algorithms (or automated speech recognition algorithms), such as Hidden Markov models (HMM) or dynamic time warping (DTW) models. Some embodiments could use speech-to-text algorithms that leverage deep neural networks, such as the Quartznet model and the Citrinet model that have been developed by NVIDIA®.

System 300 can also include large language model 120 ("LLM 120"). Using LLMs over other NLP models may provide quicker training and development of a system, since LLMs may be offered as services that do not require a lot of coding. Rather than retrain an entire LLM using standard supervised learning techniques, LLMs can be trained using so called "prompt tuning" (or "p-tuning") methods. With prompt tuning, developers can provide sample questions and responses to the LLM. When similar questions are asked at a later time, a prompt token is supplied along with the questions, to give the LLM the specific context for more accurate responses.

System 300 can also include one or more domain management systems (such as domain management system 210). A domain management system may comprise one or more domain specific algorithms. Here the term "domain specific algorithm" refers to any algorithm that solves a problem in a particular domain. For example, as described in further detail below, a domain specific algorithm could be part of a domain management system (comprised of one or more algorithms) that takes conditional statements produced by an LLM and provides corresponding actions to take in the context of the domain. As noted, exemplary domains may include, but are not limited to, a parking management domain, a data center domain and a smart city domain. However, it will be recognized that other domains are possible. The techniques discussed in this disclosure are broadly applicable to any domain where interpreting a natural language statement as a conditional logic statement is helpful.

For example, a conditional statement could be used to identify a problematic situation in the domain and associate the situation with a corresponding corrective action. A domain specific algorithm could comprise a machine learning algorithm, an expert system, or any other suitable algorithm for finding solutions to problems within a particular domain. In some embodiments, a domain specific algorithm could comprise a large language model that has been trained using prompt-based training methods (also known as p-tuning models).

System 300 can also include one or more communication modules 340. Communication modules 340 could comprise various hardware and/or software modules for receiving natural language statements as input and for sending outputs from system 300 to other systems and/or directly to end users. For example, communication modules 340 could comprise hardware and/or software for receiving audio and/or text over one or more networks, as well as for sending audio, text, and/or other kinds of data over one or more networks. In some embodiments, communication modules 340 could include software and/or hardware for synthesizing audio from the output and playing the audio for the user. In some embodiments, communication modules 340 could include software and/or hardware for sending instructions to perform an action to another device, such as a control system for a data center or a smart city.

It may be appreciated that the various components of system 300 may not be co-located within the same physical device or cluster of devices. In some embodiments, one or more components, systems, models, and/or algorithms could be stored, and run, on remote devices that are accessible as cloud services by other components of the system.

System 300 may also include a data repository 350. The data repository 350 may include information to be used by domain management system 210. For example, the data repository 350 could include historical data to help the domain management system 210 make a better judgment about how to ascribe meaning to the conditional statements produced by the large language model 120. Such historical data could also help provide corresponding responsive actions 360 accordingly. For example, the historical data could include at least one of historical sensor data, programmed knowledge, information related to the domain, or subject matter expertise. Additional aspects and examples of how natural language statements are transformed to intermediate conditional logic statements using a large language model, and how these intermediate conditional logic statements are then interpreted using domain specific algorithms to take actions in a domain are provided, below. Additional specific details in the context of a data center domain and a smart cities domain are also provided. Historical data may also be used by the LLM in formulating the conditional statement in the first place. In addition to historical data, real time data from sensors or other sources could also be received by system 300. This real time data could be used by any of the components of system 300, including LLM 120 and/or domain management system 210.

Figure 4:
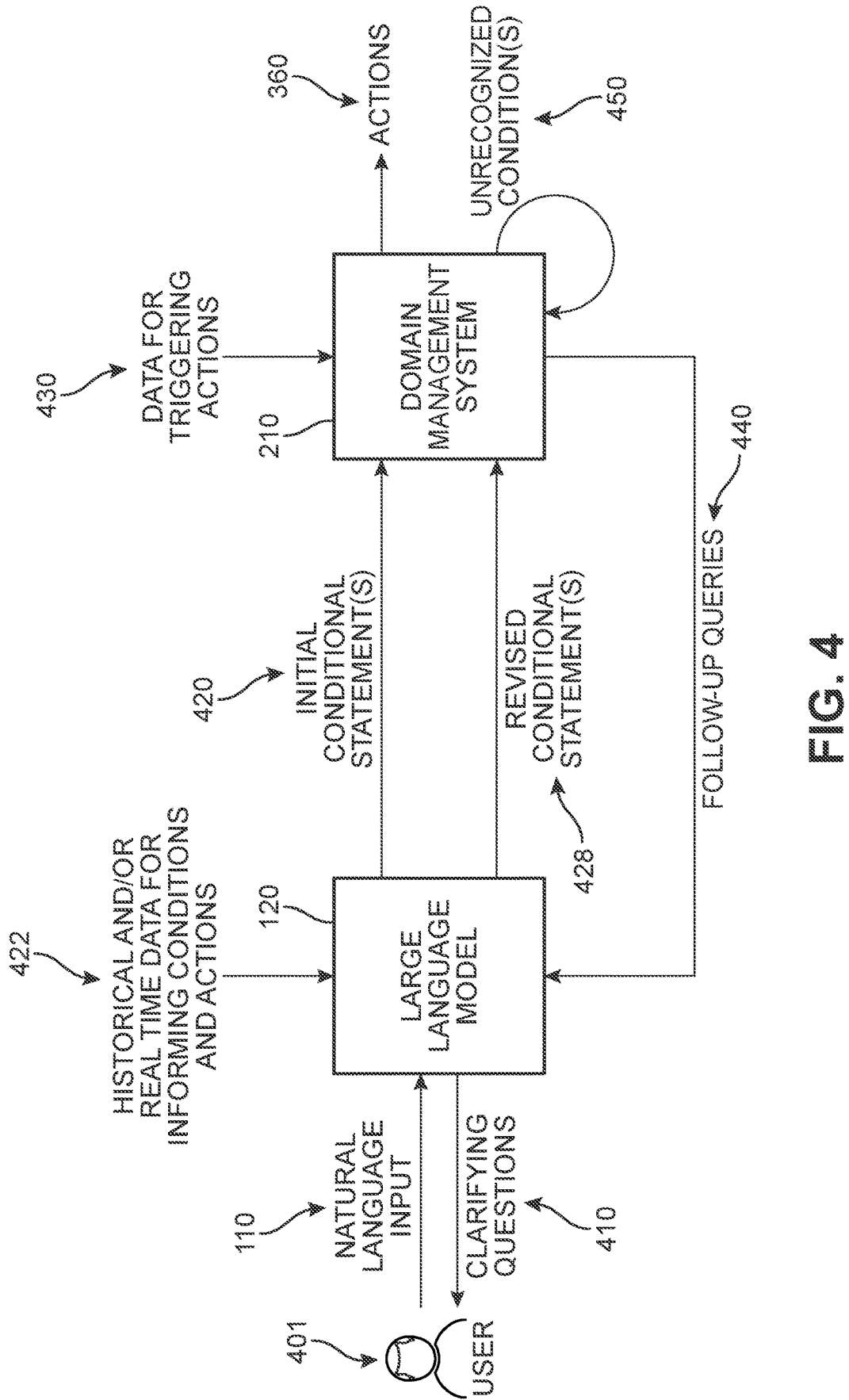
FIG. 4 is a schematic view of the flow of information through some components of a system, according to an embodiment.

FIG. 4 is a schematic view of the flow of information through some components of a system 300, according to an embodiment. Referring to FIG. 4, a user 401 may provide natural language input 110. These statements could comprise audio or text. In the cases where audio information is provided, the audio information could be transformed into suitable text input for downstream systems. This could be done using speech-to-text model 310 (see FIG. 3), for example.

The natural language input 110 are received as inputs to LLM 120 from a user. LLM 120 may reason about the natural language input 110 and in doing so transform those statements into outputs. In the reasoning, the LLM 120 may infer relationships between different elements of the inputs (including words or phrases, for example). LLM 120 may also infer relationships between elements of the inputs and other elements already stored or integrated into the model. LLM 120 may not only identify relationships between different elements (words or phrases, for example), but may identify logical relationships between the different elements that are not explicitly mentioned as part of the natural language input 110.

In addition, when determining how to generate its outputs, the LLM 120 may incorporate historical and/or real time data for informing conditions and actions 422. For example, historical data may indicate that in the past, a data center will be considered as being mildly overheated once the data center reaches a temperature of 105° F. and severely overheated once the data center reaches a temperature of 115° F. The real time data may provide information about temperatures at various portions of the data center. The real time data may also track the operation of various cooling devices at the data center. For example, the real time data may monitor the operating status of air conditioning units, liquid cooling, fans, and so on. The historical data and the real time data may also help track which actions to take. For example, the historical data may indicate that liquid cooling is most helpful when overheating occurs for specific reasons, or the real time data may indicate that certain cooling techniques are most helpful depending upon data about exactly how the overheating is distributed in the data center.

The outputs of the LLM 120 are initial conditional statements 420. Examples of such conditional statements are provided throughout this disclosure. However, in general, the initial conditional statements 420 are a result of transforming natural language, which may be vague, into a more precise representation. In the more precise representation, the initial conditional statements 420 provide conditions associated with specific tests based on sensor readings. When the tests are satisfied, the initial statements 420 provide for specific actions corresponding to the condition. For example, in some embodiments, at least one conditional logic statement defines a problematic condition in the domain that is detected based on domain specific information and the action at least partially resolves the problematic condition. For a data center, this could include a problematic condition of overloaded servers and a corresponding action of load balancing. For a smart city, this could include a problematic conditional an oil spill on a highway and a corresponding action of sending a cleanup crew.

The outputs of LLM 120 may then be used as inputs to domain management system 210. In particular, LLM 120 produces outputs in a suitable format for ingestion and processing by domain management system 210. That is, the outputs of LLM 120 are compatible with domain management system 210.

Domain management system 210 processes the outputs of LLM 120 to generate corresponding actions 360. Generated actions 360 may include one or more options or recommendations for the specific domain. Generated actions 360 could also include one or more control settings and/or control commands for another computing system and/or electromechanical control system. The domain management system 210 may also receive and monitor data for triggering actions 430.

In some cases, natural language statements provided by a user are converted into conditional statements that can be understood, and acted upon, by domain management system 210. That is, the initial conditional statements 420 are provided in the exact format and using the precise terms and conditions needed for domain management system 210 to monitor the relevant data streams and take actions in response to detecting particular conditions. However, in other cases, the initial conditional statements 420 may not be suitable for use by domain management system 210. For example, a conditional statement generated by LLM 120 may include terms that are not recognized by domain management system 210. As another example, a conditional statement generated by LLM 120 may include ill-defined terms which require more specificity before they can be utilized by domain management system 210.

When domain management system 210 has problems with received conditional statements, domain management system 210 can take corrective actions. In particular, domain management system 210 may generate a follow-up query to LLM 120 in order to obtain revised conditional statements that domain management system 210 can interpret. As shown in FIG. 4, domain management system 210 may detect unrecognized conditions 450, which causes domain management system 210 to generate follow-up queries 440. When recognizing conditions, domain management system 210 may use a variety of different types of information. For example, the information may include historical data, sensor data, previous queries, and so on. The information may help train the domain management system 210 to associate terms with meaning. Alternatively, the information may provide other ways to map terms to their meaning.

For example, a natural language term may refer to "overheating." The LLM 120 or the domain management system 210 may know from their training what specific temperatures "overheating" refers to. However, another term, such as "fix it" may be the desired action but the LLM 120 or the domain management system 210 may not have enough information to understand what "fix it" means. For example, the training may associate "fix it" with increasing fan speed and increasing air conditioning output in a specific way. Alternatively, there may be a default interpretation of "fix it." However, the training may not be sufficient to provide a clear definition for "fix it." Accordingly, the system may generate follow-up queries may include requests to provide additional information about one or more parameters that have been sent as part of initial conditional statements 420.

In some situations, LLM 120 may already have sufficient information to resolve the unrecognized conditions 450. In some situations, LLM 120 could pass additional clarifying questions 410 back to user 401, who could provide useful context or other necessary information. In either case, the LLM 120 may produce revised conditional statement(s) 428 that can resolve the issues presented by the initial conditional statement(s) 420. If issues remain, it is possible to further iterate this feedback loop.

It is contemplated that some situations may arise where a domain management system 210 has some, but not all, necessary conditional statements for reliably managing a particular domain. In some cases, it may be necessary to provide a domain management system with actions for a range of possible conditions, so that the domain management system can take suitable actions in any conditions. Thus, in some cases, domain management system 210 may identify incomplete states where domain management system 210 has some conditional statements to operate in one subset of possible conditions, but lacks conditional statements to provide instructions in a different set of possible conditions. In such cases, domain management system 210 could automatically identify a set of conditions for which it lacks corresponding logic (that is, conditional statements), and make a suitable follow-up request to LLM 120 for additional conditional statements to fill in the missing logic.

Figure 5:
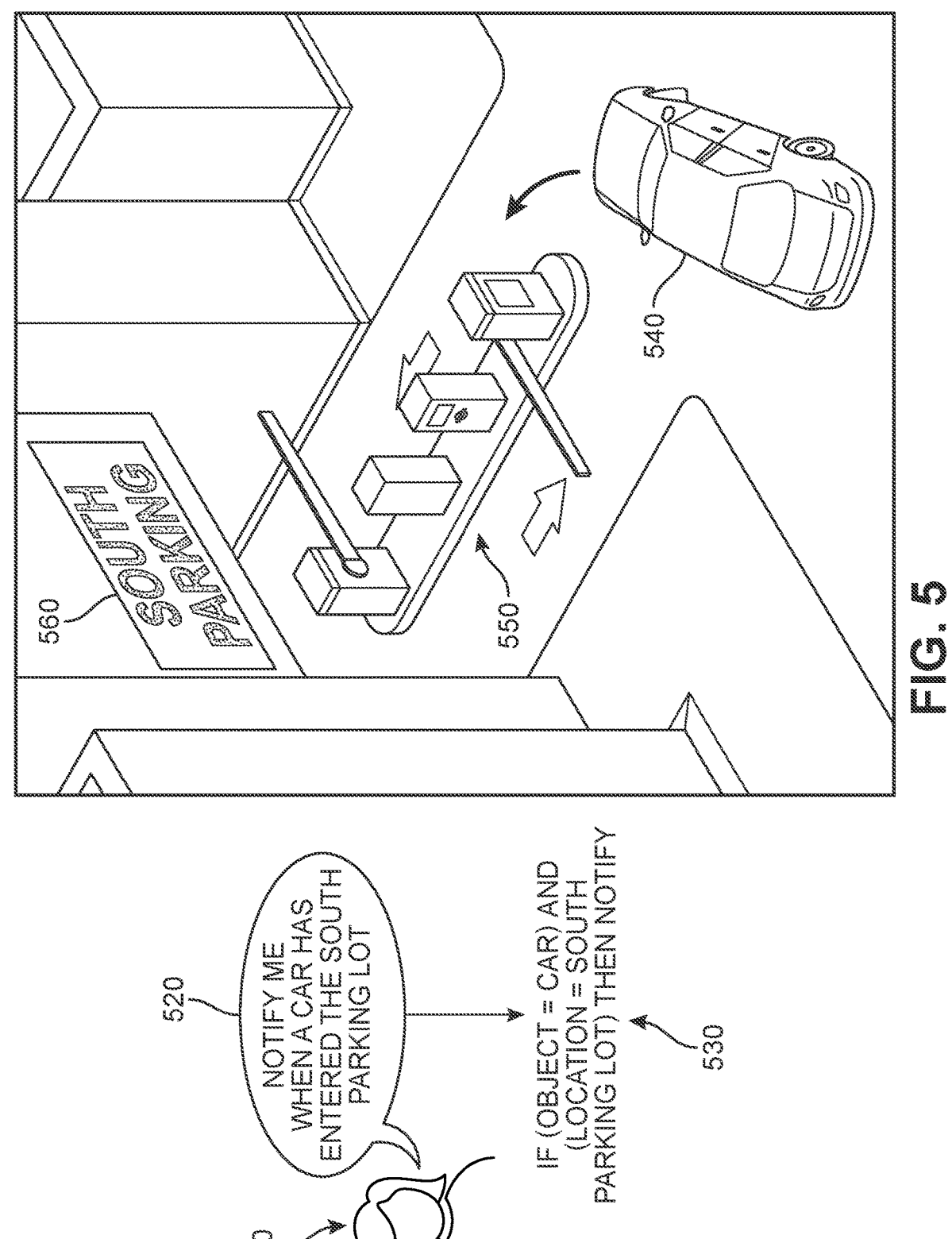
FIG. 5 illustrates a scenario in which a user requests a notification when a driver enters a parking lot, according to an embodiment.

FIG. 5 illustrates a scenario in which a user (for example, the manager of a parking garage) requests a notification when a driver enters a parking lot, according to an embodiment. For example, user 510 provides the statement 520 "Notify me when a car has entered the South Parking Lot." The statement could be spoken to any system with a microphone that is capable of passing audio to relevant systems. As shown in FIG. 5, LLM 120 may transform the statement 520 into the conditional statement 530 ("if (object==car) and (location==South Parking) then notify"). This conditional statement may be provided as pseudocode that can be directly understood/parsed by, or else translated by, domain management system 210. In this situation, domain management system 210 has sufficient domain knowledge to understand that the chained conditions "(object==car)" and ("location==south parking") indicate that the system will monitoring data streams associated with the south parking entrance (such as camera feeds, motion sensors, gate status information, payment kiosk information) and check if any detected objects are cars.

Conditional statement 530 can then be passed to, and implemented by, an associated domain management system that has resources for monitoring cars entering the facility and for generating notifications. Next to the user is an image showing how a car 540 associated with the conditional statement 520 enters the South Parking Lot 560. The car 540 passes by motion sensor 550 which is integrated into the entrance/exit of the South Parking Lot 560. Optionally, car 540 could be detected by one or more cameras stationed at the entrance. Once the car 540 passes the motion sensor 550, conditional statement 530 is triggered. Accordingly, the system performs the corresponding action (indicated in the conditional statement) by notifying user 510 that the car has entered the South Parking Lot. The notification could be provided as a text, email, or any other suitable notification.

Figure 6:
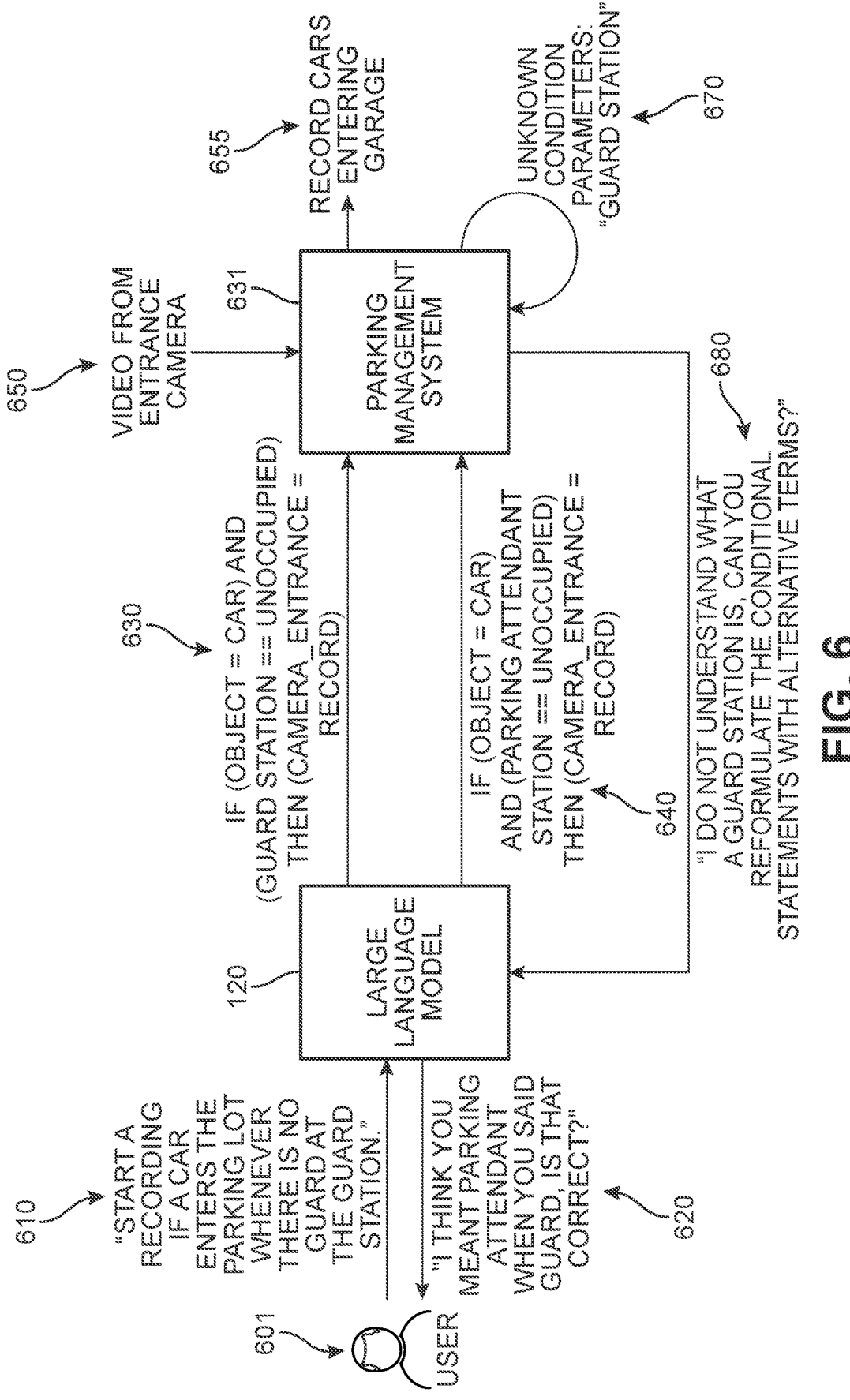
FIG. 6 is a schematic view of the flow of particular information in a scenario in which a user requests a notification when a driver enters a parking lot, according to an embodiment.

FIG. 6 is a schematic view of the flow of particular information in a scenario in which a user requests a notification when a driver enters a parking lot, according to an embodiment. User 601 may provide a natural language statement 610 such as "Start a recording if a car enters the parking lot whenever there is a no guard at the guard station" to the LLM 120. LLM 120 provides as an initial conditional statement 630 ("IF (object==car) and (guard station==unoccupied) then (camera_entrance=RECORD))." This initial conditional statement 630 may be provided to parking management system 631.

Parking management system 631 may include systems for monitoring information from various sensors and systems that are associated with a parking facility, as well as systems for taking actions (such as opening/closing gates, doors, controlling lights, recording video, and other suitable operations). In this example, parking management system 631 may receive real time video from an entrance camera (data 650) that allows the system to record and/or monitor vehicles, persons, or other objects at the entrance(s) (output 655).

In the present example, parking management system 631 understands the condition parameters "object" and "car." However, parking management system 631 does not understand the condition parameter "guard station," which is flagged as unknown condition parameters 670. Thus, parking management system 631 cannot implement the associated conditional statement since it has no way of checking the condition ("guard station==unoccupied").

Upon determining that there are one or more unknown condition parameters, parking management system 631 generates a query for LLM 120. Specifically, parking management system 631 generates follow-up query 680 ("I do not understand what a guard station is, can you reformulate the conditional statements with alternative terms?").

LLM 120 may receive follow-up query 680 and take further actions. In some cases, LLM 120 may rephrase one or more conditions or parameters. For example, LLM 120 could recognize that another term for "guard" in the context of a parking facility, is a "parking attendant." In some cases, then, LLM 120 could automatically generate a revised conditional statement 640 ("IF (object==car) and (parking attendant station==unoccupied) THEN (camera_entrance==record)"). Alternatively, in some cases, LLM 120 could further clarify the issue by posing a question to user 601, such as question 620 ("I think you meant parking attendant when you said guard, is that correct?"). A more detailed example of this clarification process for ill-posed initial conditional statements is presented below in the discussion of FIG. 10.

It may be appreciated that the processes of FIG. 6 are only intended as an example. The exemplary feedback processes shown here could be utilized for a variety of different situations where there are problems with the initial conditional statements provided by the LLM. In some cases, a domain management system may require more information to understand how to implement a particular condition and/or action. For example, consider a scenario in the parking domain where a user requests that the system "close garage doors at south entrance when there is a parade on Broad Street." In this case, the LLM might generate a conditional: "IF (parade on Broad Street) THEN close south entrance doors)."

The parking management system may not understand the condition "IF (parade on Broad Street)." In this case, follow-up queries may be generated to further clarify this condition. The system could query, for example, "revise the conditional statement to specify how I could detect the presence of a parade on Broad Street." The LLM could then reformulate the conditional statements with more specific conditional parameters, such as "IF (crowd in broadst_video_feed) THEN close south entrance doors." That is, the new conditional specifies that the system check the video feed from the camera on Broad Street, and if it detects a crowd, the condition will be met.

As already mentioned, the exemplary systems and methods can be utilized across various different domains. For example, in the context of a data center, the domain management system could be a data center management system that is configured to control various aspects of a data center. These could include both controlling computational resources within the data center, as well as controlling aspects of the physical environment of the data center, since the latter may affect the operation of the former.

Thus, the data center management system can include, or communicate with, a variety of different sensors to monitor computing resources and environmental conditions. Exemplary computing resources that could be monitored could include processor usage, memory usage, network bandwidth, and other suitable computing resources for one or more computing systems in a data center. Exemplary environmental conditions that could be monitored include temperature (of a room and/or of specific systems/components), humidity, occupancy, lighting, available power, and other suitable environmental conditions. The data center management system can also include, or communicate with, various control systems that can take action. These could include computing control systems, for example, managing processes that can be used to modify computing resources among systems in a data center. These could also include physical control systems, such as heating and/or cooling systems, humidity regulating systems, lighting systems, or other suitable systems.

Figure 7:
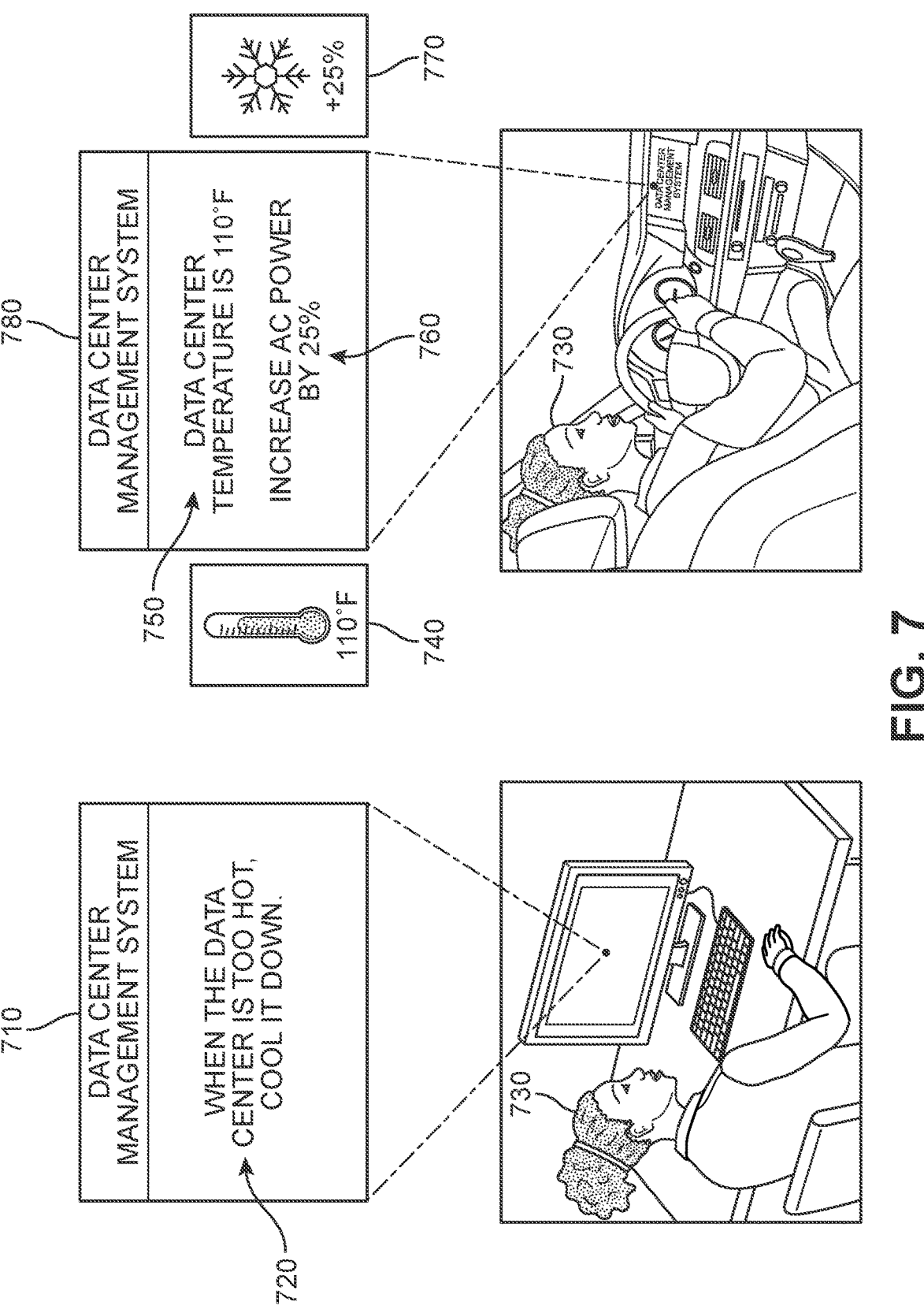
FIG. 7 illustrates a scenario in which a user requests that a fan be activated when a data center gets too hot and the data center automatically turns on the fan, according to an embodiment.
Figure 8:
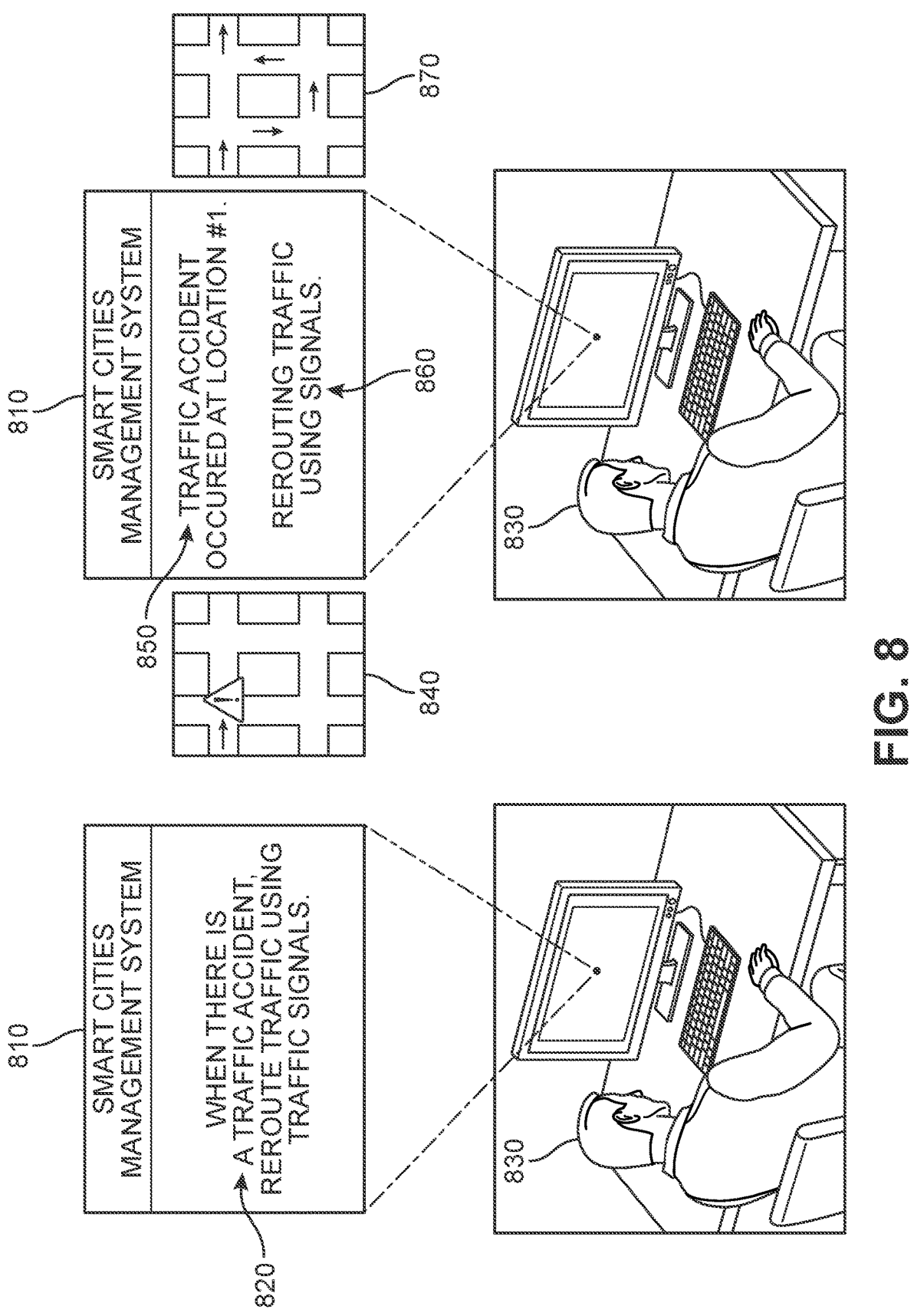
FIG. 8 illustrates a scenario in which a user requests that traffic be rerouted when a smart city detects an accident and the smart city automatically reroutes the traffic, according to an embodiment.

FIG. 7 illustrates a scenario in which a user 730 requests that a fan be activated when a data center gets too hot and the data center automatically turns on the fan, according to an embodiment. For example, the user 730 may make the statement in a data center management system 710, "When the data center is too hot, fix it" 720. The data center management system 710 may transform this statement into a corresponding condition 750, that the data center temperature is 110° F., and a corresponding action 760, increasing the air conditioning power by 25%. The data center may then detect the condition, such as by using a thermometer 740. The data center may then take corresponding cooling actions, such as by increasing the power of an air conditioner 770. FIG. 7 also illustrates a data center management system 780 that is integrated into a car cockpit. FIG. 7 shows a situation where the corresponding condition 750 and the corresponding action 760 are presented on a display integrated into a cockpit of a user's vehicle. However, this is only one example of how to present information to the user 730. For example, the results could be provided to the user 730 using the data center management system 710 on a corresponding computer monitor, as another non-limiting example.

For example, in the context of a smart city, the domain management system could be a smart city management system that is configured to control various aspects of a smart city. These could include both controlling computational resources within the smart city, as well as controlling aspects of the data gathering and operative actions of the smart city. The data gathering may provide information to control operative actions of the smart city.

Thus, the smart city management system can include, or communicate with, a variety of different sensors to monitor computing resources and environmental conditions. In particular, the sensors may include video cameras, whose output may be processed with machine vision and video analytics. Exemplary computing resources that could be monitored could include processor usage, memory usage, network bandwidth, and other suitable computing resources for one or more computing systems in a smart city. Exemplary environmental conditions that could be monitored include traffic, weather, and other suitable environmental conditions of the smart city.

The smart city management system can also include, or communicate with, various control systems that can take action in the smart city. These could include traffic control systems, for example, managing processes that can be used to monitor traffic in a smart city. However, traffic is only one aspect of a smart city, and the techniques described herein are applicable to other appropriate aspects of a smart city and appropriate actions. These could also include physical control systems, such as traffic signaling systems, lighting systems, or other suitable systems. As another alternative, a smart city may deploy emergency responders (police, fire, medical, etc.) as an action when there is an accident, a weather emergency, or so on.

In operation 920, the process uses the large language model to generate conditional statements. As discussed above, to be useful the natural language statement may produce a conditional statement that makes sense in the context of the domain in which it is to be used. In operation 930, the process determines if the domain specific algorithms are able to understand the conditional statements produced by the LLM. If not, the process proceeds to operation 940.

Figure 9:
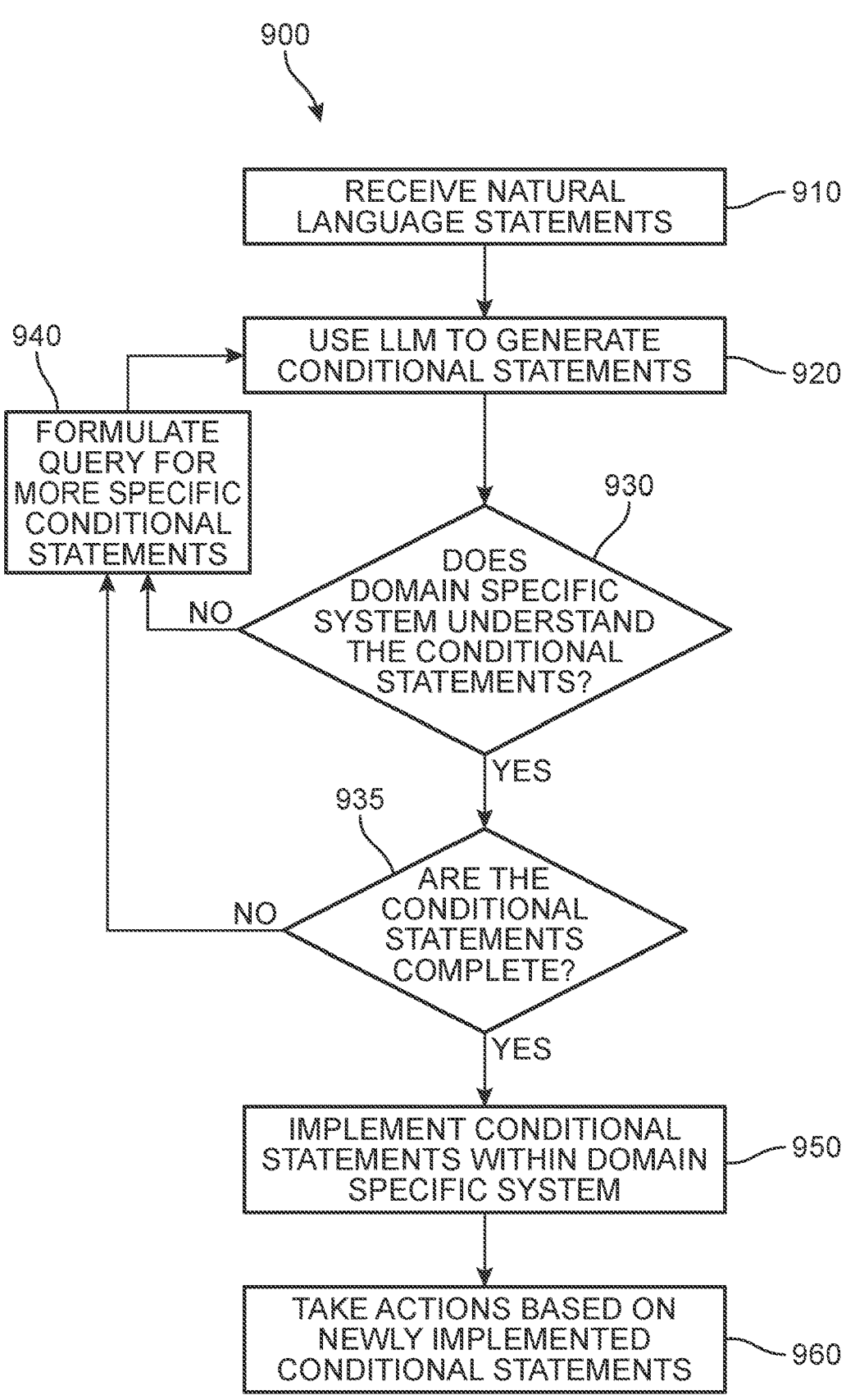
FIG. 9 is a schematic view of a process for generating actions from natural language statements corresponding to conditional statements, according to an embodiment.

FIG. 9 is a schematic view of a process 900 for generating actions from natural language statements corresponding to conditional statements, according to an embodiment. In operation 910, the process receives natural language statements. These natural language statements correspond to conditional statements in a domain. Specifically, the conditional statements correspond to one or more conditions and one or more corresponding actions.

In operation 920, the process uses the large language model to generate conditional statements. As discussed above, to be useful the natural language statement may produce a conditional statement corresponding to a conditional statement that makes sense in the context of the domain in which it is to be used. In operation 930, the process determines if the domain specific algorithms are able to understand the conditional statements produced by the LLM. If not, the process proceeds to operation 940.

In operation 940, the process formulates a query for the LLM to have the LLM provide more specific conditional statements. This operation 940 may be relevant in at least two cases. In one case, operation 940 may be relevant in that a query may be ambiguous, and it is necessary for the LLM to gather more information to disambiguate the query. For example, this case is presented in greater detail in FIG. 10.

However, in another case, operation 940 may produce a conditional statement that is meaningless. For example, the user may provide a meaningless conditional statement (such as "if the elephant is friendly, then spray chocolate"). The user may also provide a statement that does not readily map to a conditional (such as "Hello, I am having a good day,"). In these cases, a disambiguation may be required. Also, there may be defined defaults. For example, the system may know that if a certain condition is the case, a default action should occur. For example, the user may say, "It's 110° F. in the data center." The system may be able to infer (such as from previous historical data) that the appropriate response is to turn up the fans or to activate liquid cooling.

In operation 930, the process may determine that the domain specific system does understand the conditional statements. In this case, the process continues at operation 935. In operation 935, the process determines if the conditional statements provided are complete. That is, the process determines if the logic of the provided conditional statements can be implemented in a consistent and reliable way. As an illustrative example, consider a situation where a domain management system is instructed to open or close some doors to a parking garage conditioned on a particular weather event. Upon receiving the statements, the system recognizes that instructions have only been provided for some, but not all of the doors in the parking garage. In this case, the system may want to request further conditions to ensure that all doors in the parking garage are operated suitably for the given weather event.

Of course, this is just one example and in other embodiments a domain management system could check received conditional statements for completeness using any suitable checking rules or algorithms to assess completeness. If the process determines that the conditional statements are complete, the process proceeds to operation 950. Otherwise, the process may proceed to operation 940 to formulate queries that may provoke the LLM to generate conditional statements that are complete in the relevant sense.

Optionally, as part of operation 935, or as part of another operation, the process may determine if the conditional statements provided by the LLM would generate conflicts with existing conditionals, or might otherwise interfere with the general operation of the system in some way. As an example, if a conditional statement were to include a corrective action that instructs a system to heat or cool a data center beyond a threshold safe temperature for the data center, the process could formulate a query for the LLM asking for modified temperature parameters. Alternatively, the process could simply prevent the conditional statement from being implemented, in which case the system could provide a notification to the user that an error has occurred in trying to implement their natural language request.

Operation 950 implements the conditional statements within the domain specific system. Specifically, the domain specific system uses its domain specific knowledge to identify the meaning of the conditions. Then, at operation 960, the domain specific system takes the actions corresponding to the conditions in the context of the particular domain, based on the newly implemented conditional statements.

As a particular example of the above process, a natural language statement may be "IF APPLICATION IS UNSTABLE, EXPAND VM RESOURCES." This natural language statement clearly corresponds to a conditional statement. It has the format of an if/then statement. The natural language statement specifies that when an application is unstable, the data center should expand VM resources. However, it is not immediately clear what it means for an application to be unstable. Furthermore, it is not immediately clear what it means to expand VM resources in response.

Accordingly, the natural language statement is provided to a large language model for conversion into a conditional. The conditional includes a condition and a corresponding action. The condition specifies in detail how to manage the data center based on a particular definition of elements of the natural language statement. In particular, the condition specifies a meaning for how to determine that an application is "unstable." Once the condition establishes that the application is "unstable" it can then infer appropriate responsive actions.

For example, the condition produced by the large language model may take the form "LET X be application used memory*1.20; LET Y be application used memory*1.50; IF health_check==failed AND (memory usage >80% OR CPU usage >70%) THEN IF available memory >X AND available memory >Y THEN allocate new instance with memory X and compute Y AND THEN migrate traffic to new instance AND THEN shutdown previous instance ELSE send out of resource notification." The condition specifies specific tests that establish if an application is to be considered unstable.

Specifically, the test is based on a health check and properties of how much available memory there is for the system. The condition also specifies the specific actions involved in correcting the situation. Such a conditional can be formed by using a large language model to infer aspects of the meaning of the terms in the context of the domain in which they are to be applied. When the condition is satisfied, it causes the system to take the corresponding action. Here, the corresponding action is increasing a memory allocation by 20% and increasing CPU allocation by 50% with a new VM to improve system performance.

The action may be handled in at least two ways. In one way, the system informs a user of the corrective action, and the user is able to implement the corrective action. In another approach, the system automatically implements the corrective action itself. For example, if the action is that described above, the system may take control of the various systems of the data center and cause them to make the specified changes. By doing so, the system is able to detect that the application is "unstable" and perform "expand VM resources" in a way that has been determined to be appropriate in context.

Figure 10:
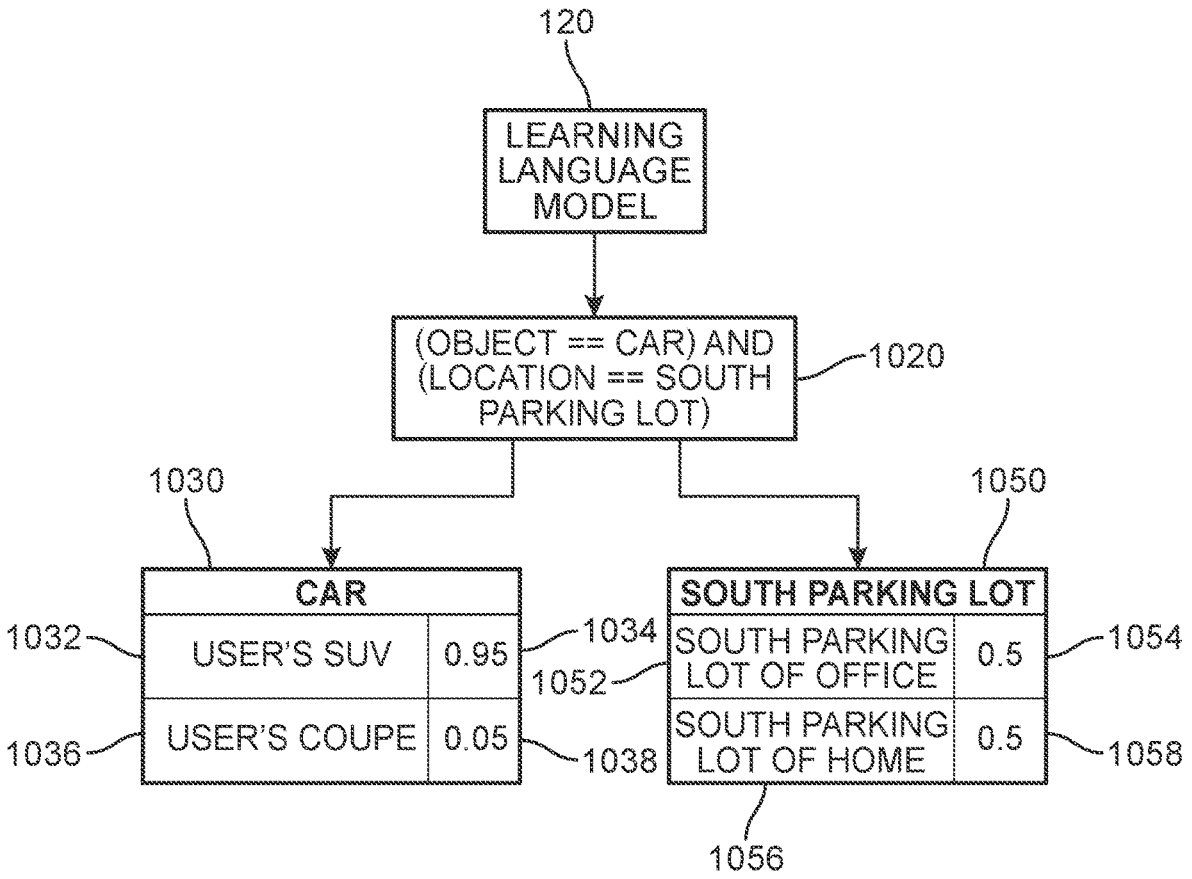
FIG. 10 is a schematic view of assessing ambiguity using domain specific knowledge and querying a large language model to resolve the ambiguity, according to an embodiment.

FIG. 10 is a schematic view of how an exemplary system may assess ambiguity using domain specific knowledge and querying a large language model to resolve the ambiguity, according to an embodiment. For example, as shown in FIG. 6, the LLM 120 may produce the conditional statement 1020 "(Object==Car) and (Location==South Parking Lot)." In order to process the conditional statement 1020, the domain management system must assign a meaning to the term "Car" 1030 and the term "South Parking Lot" 1050. For example, based on the domain specific knowledge (such as historical information and past interpretations of conditional statements), various interpretations of these terms may be associated with various probabilities.

For example, when attempting to define the term "Car" 1030, one interpretation may be a user's Sports Utility Vehicle (SUV) 1032 and another interpretation may be a user's Coupe 1036. For example, the SUV 1032 interpretation may be associated with a probability of 0.95 (data 1034) and the Coupe 1036 interpretation may be associated with a probability of 0.05 (data 1038). Thus, it is clearly quite likely that the "Car" in question is the user's SUV 1032, rather than the user's Coupe 1036. For example, there may be a determination that the User's SUV 1032 is likely in excess of a threshold. Here, the probability may be 0.95 (data 1034), which may be the greatest probability and exceed a threshold probability of 0.75. Accordingly, the determination is that the "Car" thus refers to the user's SUV 1032.

By contrast, the system is unable to ascertain a particular meaning for "South Parking Lot" 1050. For example, the system may determine that "South Parking Lot" 1050 could correspond to "South Parking Lot of a User's Office" 1052 or "South Parking Lot of a User's Home 1056." For these examples, the probability corresponding to "South Parking Lot of a User's Office" 1052 is 0.5 (data 1054). The probability corresponding to "South Parking Lot of a User's Home" 1056 is also 0.5 (data 1058).

Thus, in this example, there is no greatest probability at all. There is also no greatest probability that exceeds a threshold. In this example, there is not enough information to determine with confidence which interpretation to use. It is possible to have a default interpretation, such as defaulting to interpreting the term as "South Parking Lot of a User's Office" 1052. However, this may also be an example of when it would be helpful to generate a query for the LLM 120 indicating that additional information is required to determine how to interpret "South Parking Lot" properly.

Figure 11:
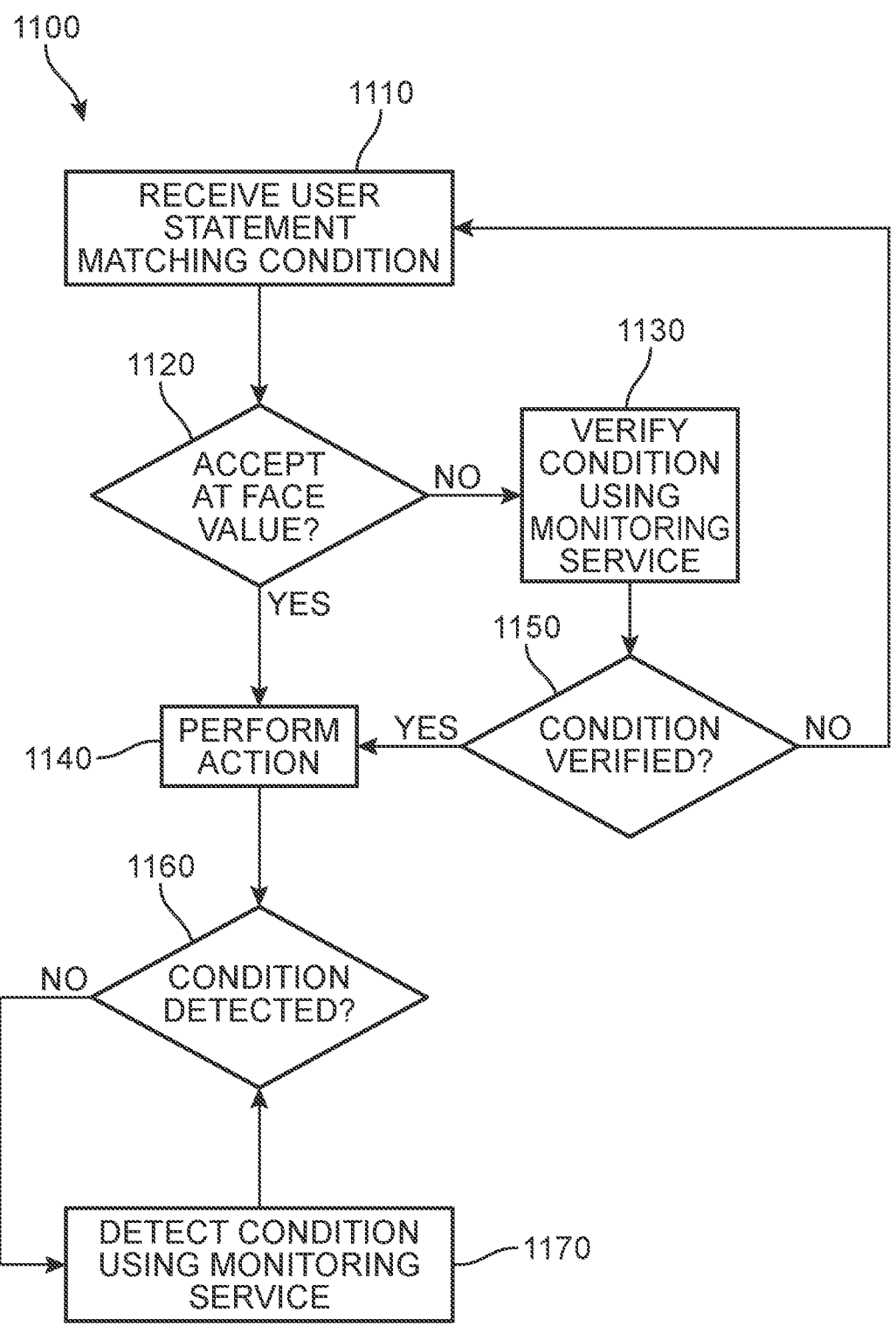
FIG. 11 is a schematic view of a process for using sensor information to verify that a condition of a conditional statement has been met, according to an embodiment.

FIG. 11 is a schematic view of a process for using sensor information to verify that a condition of a conditional statement has been met, according to an embodiment. In operation 1110, the process receives a user statement matching a condition. Such a user statement indicates that a condition has been met. For example, if the condition is that a data center is overheating, the statement may be something like "The data center is overheating," or the "The temperature of the data center is 110° F." Such a statement may correspond to a conditional statement where the condition is that a data center is overheating.

However, the user's statement may or may not be accurate. Thus, in operation 1120 the process has to decide whether or not to accept the user's statement at face value. This decision may be based on a setting of the system. The decision may also take into account how costly it would be to implement the user's statement if the condition is not met, or if the user would be upset if the system does accept the user's statement at face value. If operation 1120 determines that the system should not accept the user's statement at face value, then the process of FIG. 11 continues to operation 1130.

In operation 1130, the process verifies the condition using a monitoring service or using sensors. By so doing, operation 1130 is able to confirm that the condition is satisfied and it is appropriate to take corresponding action. For example, if the user indicates that a data center is overheating, in operation 1130 the system may verify that this is occurring by gathering information from a thermometer that could ascertain whether the user is accurate. Furthermore, operation 1130 may present an opportunity for the system to make a more particular determination based on the user's statement. For example, the user may indicate a belief that a data center is overheating. However, the system may determine that it is not appropriate to take action until the data center actually reaches a temperature of 110° F. Thus, the user may be concerned at a temperature of 105° F., but the system may postpone action until it is actually verified to be appropriate.

Once operation 1130 performs the verification, operation 1150 determines whether the relevant condition is verified. If not, the process returns to operation 1110 to await user input. If the relevant condition is verified, the process proceeds to operation 1140 to perform the relevant action. For example, if the user indicates that a data center is overheating and a sensor verifies that the claim is valid, in operation 1140 the system may take a corresponding action to cool the data center.

However, another situation that may lead to the performance of operation 1140 in which an action is taken is if the sensors automatically detect the condition and then the action is taken automatically. For example, in operation 1170, the system may detect conditions using a monitoring service. For example, the system may track the outputs of heat sensors or thermometers in the data center. The method then proceeds with operation 1160 in which the sensor information is used to determine if the condition is detected. For example, at various intervals (1 minute, 5 minutes, 10 minutes, etc.) the system may automatically check the temperature of a data center and see if it exceeds a threshold that indicates that the data center is overheating and responsive action is required. If the condition is not detected, the process may return to operation 1170 to continue periodically checking for the occurrence of the condition of a corresponding at least one conditional statement.

Figure 12:
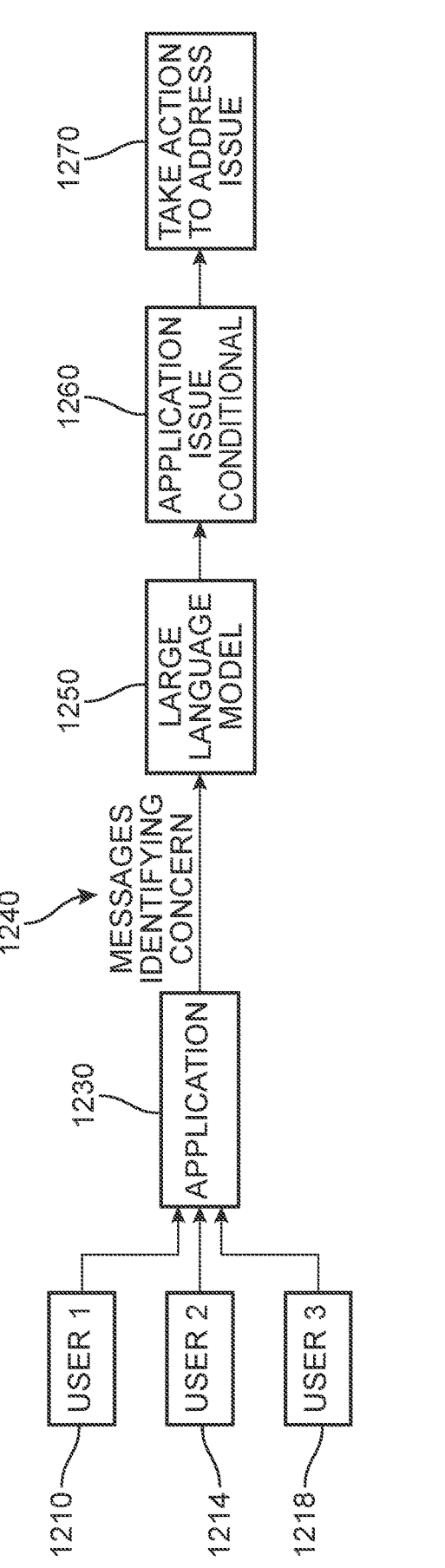
FIG. 12 illustrates a scenario in which a system monitors online messaging and interprets the messages to generate and act upon a conditional statement.

FIG. 12 illustrates a scenario in which a system monitors online messaging and interprets the messages to generate and act upon a conditional statement. In FIG. 12, multiple users concurrently use an application 1230. Such an application may be any application in which users share messages as they use the application. For example, the application 1230 could be text or audio messages shared by users as they use a game over NVIDIA® GeForce Now®. However, this is only an example, and another example could be a video-conferencing application, such as Zoom®, Microsoft® Teams®, FaceTime®, or Skype®.

For example, FIG. 12 shows three users, user 1210, user 1214, and user 1218. Each of these users may exchange messages with application 1230. These messages may be a message from one user to another, a message from one user to all other users, a message to the server, and so on. From these messages, the system extracts one or more messages identifying a concern about the performance of the application 1240.

For example, one of the messages identifying a concern 1240 may indicate that a user is frustrated with the performance of 1230. For example, user 1210 may send a message to user 1214, "My connection is really slow. I have a lot of lag." Such a message 1240 may be provided to large language model 1250. Once large language model 1250 processes the one or more messages 1240, it can generate an application issue conditional 1260. Thus, the large language model 1250 can infer that the comments indicate that there is a problem with the operation of application 1230. For example, the problem could be poor latency, response time, accuracy, and so on. These performance issues could frustrate users and could lead a system to violate a service-level agreement (SLA).

Hence, the application issue conditional 1260 could be based on the if-then relationship, "If player experience is poor, then rebalance instances between data centers." A more specific application issue conditional 1260 that could be implemented by comparison to sensor information is "IF avg latency >10 ms or latency deviation >75%, THEN provision new node in next closest data center." Once the application issue conditional 1260 indicates that the condition is satisfied, the system may take an action to address the issue 1270. Here, the relevant action is provisioning a new node. Such an action is an action that mitigates the problem.

Thus, the embodiments may provide capabilities not available in alternative technologies. First, the embodiments can use Natural Language Processing (NLP) to create conditionals for a rules system. This is an improvement because it allows users to easily add rules to a rule system without the need to manually hardcode the rules. For example, the NLP may use a Large Language Model to recognize a natural language statement and transform the statement into a conditional.

For example, the LLM can infer specifics of a condition, and specifics of an associated action. The system also has the ability to incorporate domain specific knowledge that adapts using the conditionals in a particular use case, such as a data center or a smart cities use case. The domain specific knowledge could include historical data, sensor information, and so on. Once the conditionals are produced, they can be chained together. Moreover, conditionals may be converted into an explanation that explains what the meaning of a conditional is.

The system may also use a feedback loop that identifies when a natural language statement corresponds to a conditional statement produced by the LLM that is ambiguous or incomprehensible and gather more information. Hence, the embodiments provide for an inventive way to use NLP techniques, such as an LLM to receive natural language statements and convert them into conditional logic statements having meanings. These statements can be introduced into rules systems to provide a flexible, simple way to add rules to the rules systems.

The embodiments may make use of any suitable kinds of neural networks for performing various functions and tasks as described above. A neural network can be any type of neural network usable to perform neural network operations further described herein. In some embodiments, neural networks are trained using a training framework such as a generative adversarial network (GAN). In some embodiments, a deep neural network is trained using a training dataset and training framework such as a CUDA, PyTorch framework, TensorFlow, Boost, Caffe, Microsoft Cognitive Toolkit/CNTK, MXNet, Chainer, Keras, Deeplearning4j, or other training framework. In one embodiment, weights may be chosen randomly or by pre-training using a deep belief network. In another embodiment training may be performed in either a supervised, partially supervised, or unsupervised manner.

In one embodiment, an untrained neural network is trained using supervised learning, where a training dataset includes an input paired with a desired output for an input, or where training dataset includes input having a known output and an output of neural network is manually graded. In another embodiment untrained neural network is trained in a supervised manner and processes inputs from training dataset and compares resulting outputs against a set of expected or desired outputs. In one embodiment, errors are then propagated back through untrained neural network. In another embodiment training framework adjusts weights that control untrained neural network. In one embodiment, training framework includes tools to monitor how well the untrained neural network is converging towards a model, such as a trained neural network, suitable to generating correct answers, based on input data such as a new dataset. In another embodiment, a training framework trains an untrained neural network repeatedly while adjusting weights to refine an output of untrained neural network using a loss function and adjustment algorithm, such as stochastic gradient descent. In one embodiment, the training framework trains untrained neural network until the untrained neural network achieves a desired accuracy. In another embodiment the trained neural network can then be deployed to implement any number of machine learning operations.

In other embodiments, the untrained neural network is trained using unsupervised learning, where the untrained neural network attempts to train itself using unlabeled data. In one embodiment, an unsupervised learning training dataset will include input data without any associated output data or "ground truth" data. In another embodiment an untrained neural network can learn groupings within the training dataset and can determine how individual inputs are related to the untrained dataset. In one embodiment, unsupervised training can be used to generate a self-organizing map in the trained neural network capable of performing operations useful in reducing dimensionality of a new dataset. In another embodiment unsupervised training can also be used to perform anomaly detection, which allows identification of data points in the new dataset that deviate from normal patterns of the new dataset.

In another embodiment, semi-supervised learning may be used, which is a technique in which in the training dataset includes a mix of labeled and unlabeled data. In one embodiment, the training framework may be used to perform incremental learning, such as through transferred learning techniques. In another embodiment incremental learning enables a trained neural network to adapt to a new dataset without forgetting knowledge instilled within the trained neural network during initial training.

Media generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server or in a data center and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA® GeForce Now® (GFN), and the like.

In addition, sound or other audio generated applying one or more of the techniques disclosed herein may be produced by a speaker or other audio output device. In some embodiments, the audio device may be coupled directly to the system or processor generating the sound. In other embodiments, the audio device may be coupled indirectly to the system or processor such as via a network. Examples of such networks include the Internet, mobile telecommunications networks, a WIFI network, as well as any other wired and/or wireless networking system. When the audio device is indirectly coupled, the sound generated by the system or processor may be streamed over the network to the display device. Such streaming allows applications and other software which include audio to be executed on a server or in a data center and the generated sound to be transmitted and produced by one or more user devices (such as a computer, smartwatch, smartphone, other mobile device, etc.) that are physically separate from the server or data center. Hence, the techniques disclosed herein can be applied to enhance the sounds that are streamed and to enhance services that provide audio.

User interfaces for APIs (application programming interfaces) can be used to facilitate an end user's interaction with, for example, a distributed computing environment (e.g., a web-based application), or an application residing wholly on a single computer system (e.g., a stand-alone application). In different embodiments, one or more of the computing devices can include a device display ("display") that can, for example, present information and media for a software application ("app"). In some embodiments, the app is associated with or is a platform providing the audio modification assistant service. In some cases, user devices may run client software through a web browser, in which case the client software may be hosted on a server associated with computer system. In other cases, user device may run client software in the form of a native software application that has been downloaded through a centralized marketplace (i.e., an "app store"). In some embodiments, the app can be otherwise downloaded to be accessible locally on the device. In some cases, while the client software that allows users to perform various tasks may be run on user device, some of the software data may be retrieved from and stored on databases associated with a remote server.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, smart watches, smart glasses, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present disclosure may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct disclosure as defined by the claims. Any feature or element of any embodiment may also be combined with features or elements from other disclosures to form another distinct disclosure as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

We claim:

1. A method, comprising:

receiving one or more natural language statements at one or more large language models, the one or more natural language statements comprising a statement to start a video recording by a camera of parking facility in response to a detected condition at the parking facility;

transforming, by the one or more large language models, the one or more natural language statements into one or more conditional logic statements, wherein the one or more large language models identify features of the one or more natural language statements corresponding to conditions in the parking facility and includes the features in the one or more conditional logic statements;

receiving, at a parking management system associated with the parking facility, the one or more conditional logic statements from the one or more large language models;

receiving, at the parking management system, data from one or more sensors at the parking facility;

detecting, by the parking management system, that the at least one of the one or more conditional logic statements is true based on the data from the one or more sensors;

and starting a video recording by the camera at the parking facility in response to detecting that the at least one of the one or more conditional logic statements is true.

2. The method of claim 1, wherein the one or more sensors include a motion sensor.

3. The method of claim 1, wherein the conditional logic includes a conditional logic statement in at least one of a pseudo code or a high level programming language.

4. The method of claim 1, wherein the transforming is further based on one or more sensor data instances.

5. The method of claim 4, wherein the transforming includes the one or more large language models processing the one or more natural language statements and the one or more sensor data instances.

6. The method of claim 1, wherein the method includes providing a notification.

7. The method of claim 1, wherein the parking management system uses at least one of historical sensor data, programmed knowledge, information related to parking, or subject matter expertise.

8. The method of claim 1, wherein the method further includes:

sending, by the parking management system, a request to the one or more large language models to generate a set of updated conditional logic statements; and generating, by the one or more large language models, the set of updated conditional logic statements and sending the set of updated conditional logic statements to the parking management system.

9. The method of claim 1, wherein the one or more large language model performs natural language processing on the one or more natural language statements using a parallel processing accelerator capable of accessing at least 150 terabytes of coherent memory.

10. The method of claim 1, wherein the conditional logic specifies a problematic condition.

11. A method, comprising:

receiving one or more natural language statements at one or more large language models, the one or more natural language statements comprising a statement to automatically activate cooling systems in a data center in response to a detected condition at the data center;

transforming, by the one or more large language models, the one or more natural language statements into one or more conditional logic statements that are formatted for a data center management system, wherein at least one of the one or more conditional logic statements includes an instruction to activate the cooling systems when a condition of the at least one of the one or more conditional logic statements is true;

receiving, at the data center management system associated with the data center, the conditional logic statements from the one or more large language models;

receiving, at the data center management system, data from one or more temperature sensors at the data center;

detecting, by the data center management system, that the at least one of the one or more conditional logic statements is true based on the data from the temperature sensors; and activating the cooling systems in the data center in response to detecting that the at least one of the one or more conditional logic statements is true.

12. The method of claim 11, wherein the method further includes:

sending, by the data center management system, a request to the one or more large language models to generate a set of updated conditional logic statements; and generating, by the one or more large language models, the set of updated conditional logic statements and sending the set of updated conditional logic statements to the data center management system.

13. The method of claim 11, wherein at least one of the one or more natural language statements is a message shared between a user of an application and the application;

wherein the message indicates a performance problem for the application; and the method further comprises:

detecting the performance problem; and performing a corresponding action to mitigate the performance problem.

14. The method of claim 11, wherein the one or more large language model performs natural language processing on the one or more natural language statements using a parallel processing accelerator capable of accessing at least 150 terabytes of coherent memory.

15. The method of claim 11, further comprising:

wherein the conditional logic defines a problematic condition in the data center that is detected based on data center information.

16. A method, comprising:

receiving one or more natural language statements at one or more large language models, the one or more natural language statements comprising a statement to automatically reroute traffic in response to an accident;

transforming, by the one or more large language models, the one or more natural language statements into conditional logic statements;

receiving, at a smart city management system associated with the smart city, the conditional logic statements from the one or more large language models;

sending, by the smart city management system, a request to the one or more large language models to generate a set of updated conditional logic statements;

generating, by the one or more large language models, the set of updated conditional logic statements and sending the set of updated conditional logic statements to the smart city management system;

receiving, at the smart city management system, data from one or more sensors in the smart city;

detecting, by the smart city management system, that the at least one of the one or more conditional logic statements is true based on the data from the one or more sensors; and controlling, by the smart city management system, one or more traffic lights to reroute traffic in response to detecting that one or more of the set of updated conditional logical statements are true;

wherein the one or more large language model performs natural language processing on the one or more natural language statements using a parallel processing accelerator capable of accessing at least 150 terabytes of coherent memory.

17. The method of claim 16, wherein the data comprises information indicating that a traffic accident has occurred.

18. The method of claim 17, wherein the smart city management system uses a video analytics application framework to process the data.

19. The method of claim 16, wherein the one or more sensors include a camera.

20. The method of claim 16, wherein processing the data includes identifying traffic patterns.

\* \* \* \* \*